R. P. MAY.
COMBINED BRAKE AND ACCELERATOR.
APPLICATION FILED SEPT. 19, 1919.
1,406,402.
Patented Feb. 14, 1922.
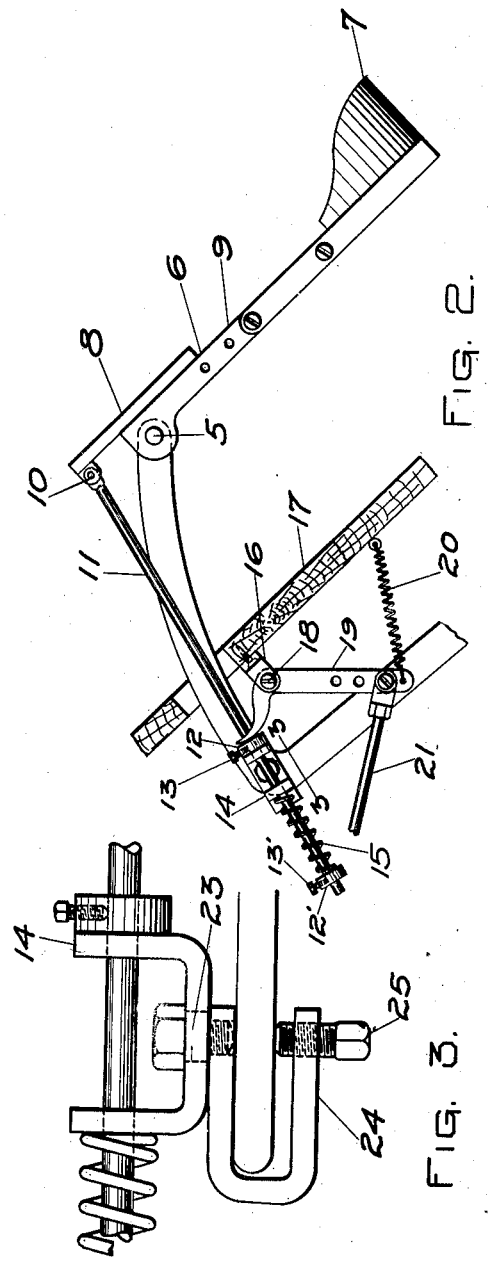
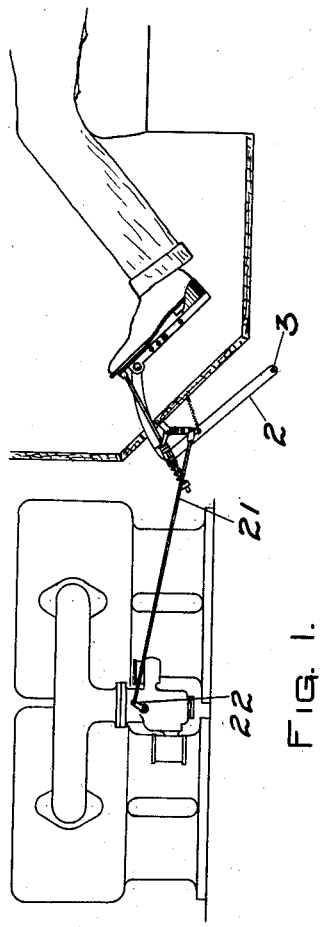
Russell P. May.
INVENTOR.
BY
Baron Fenwick Lawrence,
ATTORNEYS

UNITED STATES PATENT OFFICE.

RUSSELL P. MAY, OF WASHINGTON, DISTRICT OF COLUMBIA.

COMBINED BRAKE AND ACCELERATOR.

1,406,402.  Specification of Letters Patent.  Patented Feb. 14, 1922.

Application filed September 19, 1919. Serial No. 324,783.

*To all whom it may concern:*

Be it known that I, RUSSELL P. MAY, a citizen of the United States, residing at Washington, in the District of Columbia, have invented certain new and useful Improvements in Combined Brakes and Accelerators; and I do hereby declare the following to be a full, clear, and exact description of the invention, such as will enable others skilled in the art to which it appertains to make and use the same.

This invention relates to brakes, and while particularly adapted to brakes for automobiles in which the brake is combined with the accelerator, is not limited thereto.

An object of this invention is to provide a brake in combination with a means for operating an accelerator that will be of simple and easy construction, and easy installation, and of efficient operation, and that will operate the accelerator without the operation of the brake or that will operate both the brake and the accelerator in combination.

A further object of this invention is to provide a brake which when operated will release an accelerator operator and which carries upon itself a means for operating the said accelerator independently of the operation of said brake.

A further object of this invention is to provide a foot rest in a power driven vehicle, which foot rest by the easy moving of the foot will cause to be operated both a brake and accelerator or an accelerator independently of said brake.

A further object of this invention is to provide a spring means for operating an accelerator and a means for holding said accelerator from operation by said spring normally and releasing said holding means automatically when a brake is operated and at the same time provide for the operation of said accelerator by a slightly different movement of the foot than would be had in the operation of said brake.

With these and other objects in view the invention consists of the construction, combination, and in details of arrangement as hereinafter more fully described and claimed.

In the drawings:

Figure 1 is a diagrammatic view of this device as attached to the floor of a motor vehicle and the engine of this vehicle.

Figure 2 is an enlarged view of a portion of Figure 1.

Figure 3 is a right angle view at 3—3 in Figure 2.

In detail, the invention comprises a brake lever 2 pivoted at 3 and having pivoted thereon at 5 a foot rest 6, said foot rest comprising a heel portion 7, a toe portion 8, relatively positioned at 9, a perforation in said toe portion at 10 forming a pivot for a rod 11, said rod 11 having thereon collars 12 and 12' held by set screws 13 and 13', and said rod slidably mounted in a yoke 14 and yieldingly held away from said foot rest by spring 15, said collar 12' adjustable on said rod for the purpose of governing the tension of said spring 15, and the said collar 12 adjustable on said rod for the purpose of determining the relative length of said rod between said yoke and said foot rest when normally held by said spring on its seat. There is also provided a bracket 16 mounted on the floor 17 of said car, said bracket 16 having pivoted thereon at 18 a crank 19, one end of said crank 19 normally engaging collar 12 and yieldingly held against collar 12 by spring 20 and when in engagement with said collar 12 drawn by said spring 20 to its utmost predetermined position causing a rod 21 to position an accelerator 22 in a predetermined normal fuel admission, and operative when pulled against said spring 20 to cause rod 21 to accelerate the fuel supply into the engine. Yoke 14 is pivoted at 23 to clamp 24, which clamp 24 is affixed by set screw 25 to brake lever 2. Thus, upon the angular movement of the brake lever upon pivot 3, clamp 24 and yoke 14, and rod 11 with collar 12, will move with said brake lever 2, and since such movement will relieve crank 19 at the point of contact with collar 12, this movement will allow spring 20 to give an angular movement to crank 19 and thus draw rod 21 to retard the fuel supply to the engine. If, however, pressure is applied upon the heel member 7 of sufficient force to cause the movement of lever 2 upon pivot 3 and of sufficient force to overcome the resistance of spring 15, collar 12 will push against the point of contact of crank 19 upon collar 12 and cause an angular movement of said crank upon pivot 18 and will thereby move rod 21 to accelerate the fuel supply to said engine. Thus by the pressure upon the toe 8 sufficient to turn lever 2 upon pivot 3 both the brake and the fuel retarder are operated, and by a pressure upon the heel 7 the accelerator alone is operated.

It is particularly pointed out that the crank 19 and the brake are not connected and that the rod 11 does not operate crank 19 but releases said crank to be operated by the spring 20, in other words the parts are not connected together, but are merely in abutment.

What I claim is:

1. A controlling apparatus for motor vehicles, comprising a brake lever, a foot piece pivotally connected thereto, a spring-actuated rod carried by the brake lever and connected to the toe portion of the foot piece, a collar on the rod, a spring-actuated crank pivoted in juxtaposition to the rod and having one end bearing against the collar and an accelerator operating rod connected to the other end of the crank whereby the brake lever and accelerator can be operated simultaneously or independently by the application of pressure to the foot piece.

2. A controlling apparatus for motor vehicles comprising a brake lever, a foot treadle pivotally connected thereto, a U-shaped bracket movably mounted upon the brake lever, a spring actuated rod slidable through the end portions of the bracket and having pivotal connection with the foot treadle, a stop upon the rod, a lever member pivoted adjacent the rod and having one end engaging the stop and an accelerator operating rod connected with the other end of said lever.

In testimony whereof I affix my signature.

RUSSELL P. MAY.